United States Patent
Zhang et al.

(10) Patent No.: US 9,369,986 B2
(45) Date of Patent: Jun. 14, 2016

(54) WIRELESS COMMUNICATION NETWORK FOR ESTIMATING THE ACCURACY OF FINGERPRINTING POSITIONING ALGORITHMS

(71) Applicant: TELEFONAKTIEBOLAGET L M ERICSSON (PUBL), Stockholm (SE)

(72) Inventors: Yang Zhang, Sollentuna (SE); Edison Shu, Shanghai (CN); Torbjörn Wigren, Uppsala (SE); Aron Yu, Shanghai (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/438,190

(22) PCT Filed: Dec. 27, 2012

(86) PCT No.: PCT/SE2012/051504
§ 371 (c)(1),
(2) Date: Apr. 23, 2015

(87) PCT Pub. No.: WO2014/065735
PCT Pub. Date: May 1, 2014

(65) Prior Publication Data
US 2015/0341895 A1    Nov. 26, 2015

(30) Foreign Application Priority Data
Oct. 24, 2012 (WO) ................ PCT/CN2012/083439

(51) Int. Cl.
*H04W 4/02* (2009.01)
*H04W 64/00* (2009.01)
*G01S 5/02* (2010.01)

(52) U.S. Cl.
CPC ............. *H04W 64/003* (2013.01); *G01S 5/021* (2013.01); *G01S 5/0252* (2013.01); *H04W 4/02* (2013.01); *H04W 64/00* (2013.01)

(58) Field of Classification Search
CPC ........ H04W 4/02; H04W 64/00; H04W 68/12
USPC ............. 455/456.1, 456.2, 457, 456.3, 456.5; 370/252
See application file for complete search history.

(56) References Cited

U.S. PATENT DOCUMENTS

| 6,026,304 A | 2/2000 | Hilsenrath et al. |
| 8,280,384 B2 | 10/2012 | Carlson et al. |
| 2003/0064735 A1 | 4/2003 | Spain et al. |

(Continued)

OTHER PUBLICATIONS

Ericsson, "On RFPM scenarios" 3GPP TSG-RAN WG4 Meeting #62bis, R4-121775, 2012, 6 pages.

(Continued)

*Primary Examiner* — Sam Bhattacharya
(74) *Attorney, Agent, or Firm* — Patent Portfolio Builders, PLLC

(57) ABSTRACT

Presented are methods and apparatus for generating an inaccuracy characteristic for a fingerprinting positioning algorithm calculation associated with a user equipment location. Fingerprinting positioning measurements are compared to high-accuracy positioning measurements and an error value is determined. The error values are accumulated and the inaccuracy characteristic is generated based on an inaccuracy calculation. For areas where insufficient data is available, an inaccuracy characteristic value can be interpolated or extrapolated from adjacent areas containing sufficient data.

24 Claims, 9 Drawing Sheets

(56) References Cited

U.S. PATENT DOCUMENTS

2007/0202887 A1   8/2007   Counts et al.
2010/0324813 A1   12/2010  Sundararajan et al.

OTHER PUBLICATIONS

Lemelson et al. "Error Estimation for Indoor 802.11 Location Fingerprinting" LNCS 5561, 2009, pp. 138-155.

3GPP, 3rd Generation Partnership Project; Technical Specification Group Radio Access Network; Stage 2 functional specification of User Equipment (UE) positioning in UTRAN (Release 11), 3GPP TS 25.305, V11.0.0, 2012, 80 pages.

Wigren, "Adaptive Enhanced Cell-ID Fingerprinting Localization by Clustering of Precise Position Measurements" IEEE Transactions on Vehicular Technology, vol. 56, No. 5, 2007, pp. 3199-3209.

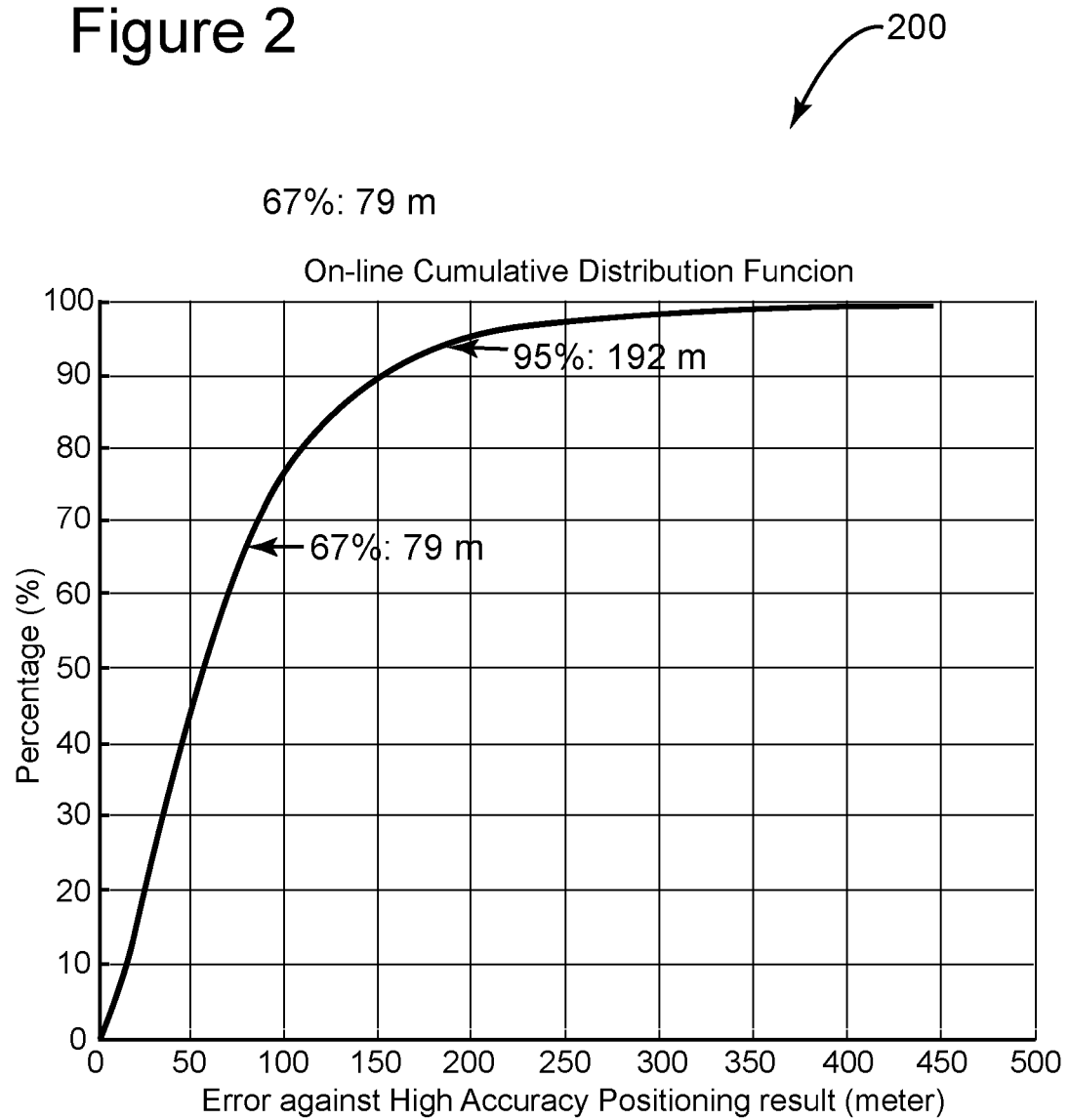

1

WIRELESS COMMUNICATION NETWORK FOR ESTIMATING THE ACCURACY OF FINGERPRINTING POSITIONING ALGORITHMS

CROSS REFERENCE TO RELATED APPLICATION(S)

This application is a 35 U.S.C. §371 National Phase Entry Application from PCT/SE2012/051504, filed Dec. 27, 2012, designating the United States, and also claims the benefit of International Application No. PCT/CN2012/083439, filed Oct. 24, 2012. The disclosures of both applications are incorporated herein in their entirety by reference.

TECHNICAL FIELD

The present invention generally relates to fingerprinting positioning technology and, more particularly, to mechanisms and techniques for estimating the accuracy (or equivalently the inaccuracy) of fingerprinting positioning algorithms.

BACKGROUND

Fingerprinting positioning technologies, also known as radio pattern matching (RPM) or radio signal positioning (RSP), represent a family of path-loss based technologies that rely on matching the radio frequency (RF) environment, as experienced by the user equipment (UE), to the known, estimated or otherwise mapped characteristics of the larger RF system in which the UE is operating in order to generate position or location information for the UE. Information from the UE, including measurements of neighbor cell signal strengths, time delay and other network parameters form the basis of the RF environment that is compared to the established system RF database.

Thus, radio fingerprinting positioning methods are based on measurements made by the UE and the base station. One measurement set usable for radio fingerprinting is defined in 3GPP Technical Specification 25.215 and is incorporated herein by reference. Generally speaking, such fingerprinting positioning algorithms operate by creating a radio fingerprint for each point of a fine coordinate grid that overlays the radio access network (RAN). Each of the measurements associated with a radio fingerprinting positioning method can be associated with an identity of a radio base station (RBS), and possibly also one or more points of the fine coordinate grid.

The fingerprint position can, for example, comprise 1) the cell identities detected by the user equipment, in each grid point; 2) quantized path loss or signal strength measurements, with respect to multiple radio base stations, performed by the user equipment, in each grid point; 3) quantized round trip time (RTT) in Wideband Code Division Multiple Access (W-CDMA) networks, Timing Advance (TA) in Global System for Mobile (GSM) communications and Long Term Evolution (LTE) networks and UE receive-transmit time difference in LTE networks, in each grid point; 4) quantized noise rise, representing the load of a Code Division Multiple Access (CDMA) system, in each grid point; 5) quantized signal quality, e.g., RxQual parameter in GSM, $E_c/N_0$ sensitivity parameter in W-CDMA and reference signal received quality (RSRQ) in LTE; 6) radio connection information, e.g., radio access bearer (RAB); and/or 7) quantized time. Whenever a position request arrives at a node which is responsible for providing position information, a radio fingerprint is measured, corresponding grid points with similar characteristics are looked up and a location estimate is calculated and reported.

Adaptive Enhanced Cell Identity (AECID) is a fingerprinting positioning technology, developed by Telefonaktiebolaget L M Ericsson (Publ), that refines the basic cell identity positioning method in a variety of ways. The AECID positioning method is based on the concept that high-precision positioning measurements, e.g., Assisted Global Positioning System (A-GPS) measurements, can be interpreted as points that belong to regions where a particular cellular radio propagation conditions persist.

In a first step of the AECID method, an A-GPS positioning is performed at the same time as a UE network signal measurement. The AECID positioning method introduces the concept of tagging of high-precision measurements according to the seven predefined criteria previously described above relative to a fingerprint. It is important to note that the tag consists of a vector of indices wherein each index comprises an enumerable number of discrete values. Accordingly, continuous value variables used for tagging, e.g., path loss, are quantized. As a second step of the AECID method, high-precision positioning measurements that have the same tag in different high-precision measurement clusters are collected and further processed.

A third step comprises computing a polygon, representing the geographical extension of a cluster, for each stored high-precision position measurement cluster. A geographical region in this context can be smaller than the extension of a cell of the cellular system.

A fourth and final step of the AECID fingerprinting algorithm comprises, for an incoming positioning request, obtaining the UE's network measurement, then, by looking up cell identities or tags, the polygon corresponding to the determined tag is looked up in a tagged database of polygons and reported, e.g., in the WCDMA system over the Radio Access Network Application Part (RANAP), using the polygon format. The two most pronounced properties of the AECID fingerprinting algorithm comprise minimizing the area of the polygon, i.e., accuracy is maximized, and precisely known, as a constraint in the algorithm, and determining the probability that the terminal is within the polygon, i.e., the confidence.

A significant parameter for any positioning algorithm is the horizontal accuracy or inaccuracy. Although simple in theory, this parameter is not straightforward to define, based on the 3GPP standard defining a plurality of position formats with many of the formats involving irregularly shaped areas. Some of these formats have explicit uncertainty information while others have the uncertainty information implicitly embedded in other aspects of the format.

One possible method of computing the inaccuracy of a positioning algorithm is to first compute the area of the region in which the UE is determined to reside. The accuracy is then computed as the radius of a circle having the same area as the region where the UE is located. A more conservative accuracy measurement is obtained if the inaccuracy is considered to be the maximum distance between a center point of the region where the UE is located, and any other point in the region. It should be noted that the accuracy is not the only parameter of interest, the confidence, defined as the probability that the UE is actually within the reported region, is of equal importance. The importance of the confidence resides in the balance struck between accuracy and confidence, i.e., a better accuracy can be stated when associated with a reduction in the confidence of the reported accuracy. Accordingly, both parameters are desirable when the associated standard allows.

Accuracy and confidence are useful in several parts of the positioning system. When a positioning request arrives, at the positioning node, from an end user, a decision must be made on which positioning algorithm to employ. The positioning node looks up prior accuracies of the available positioning methods and compares these to the signalled requested accuracy from the end user to determine which positioning method to select. Next, after receiving a positioning result from the selected positioning algorithm, the achieved accuracy is calculated and, if the requested accuracy was achieved, the positioning node reports the result and possibly the accuracy to the end user. If the requested accuracy is not met then the positioning node can select another positioning algorithm and attempt another positioning request.

Looking specifically to the AECID fingerprinting positioning method, accuracy is impacted by many factors. First, there is the accuracy of the A-GPS, Uplink Time Difference of Arrival (U-TDOA), and Observed Time Difference of Arrival (OTDOA) high-accuracy measurements, i.e., the reference positions that are clustered, to be considered. Outside metropolitan areas, A-GPS has an expected accuracy on the order of a few meters but within metropolitan areas, it has accuracy similar to U-TDOA and OTDOA, in the ten to one hundred meter range based on A-GPS coverage issues associated with being indoors or in the shadow of tall buildings. Second, there is the accuracy of the measurements used to create the fingerprint to be considered. In this context, TA and RTT are beneficial when compared to path loss and signal strength, that are known to have accuracies of about half the measured distance based on shadow fading.

Third, the radio environment itself is a factor in the accuracy of the AECID fingerprinting positioning algorithm's results. As one example, path loss measurements are sensitive to the propagation conditions associated with the radio environment. Fourth, the positioning traffic should also be considered. Densely populated areas will have a greater amount of positioning traffic than sparsely populated areas and consequently it will be more difficult to populate the positioning database in sparsely populated areas. Simulation software can be used to generate virtual data but the burden of accuracy is then shifted to the quality of the simulation software. Fifth, the cell planning in the target area also impacts accuracy of the AECID algorithm. Similar to the volume of traffic in urban versus rural areas, the number of cells in rural areas are smaller and separated by a greater distance than the cells in an urban area, leading to a reduction in resolution/discrimination among fingerprints and a lower level of accuracy.

In summary, the accuracy of fingerprinting methods in general, and AECID as a particular example, has a dependency on 1) the quality/quantity of the collected field measurements; 2) the environmental impact, e.g., fading due to mobility and different buildings; and 3) radio cell planning and distribution of RBSs. All of the above referenced factors can differ from location to location making it difficult to predict how accurate a positioning result will be before the positioning result has been produced. Consequently, the available methods for generating an a priori accuracy estimate suffer from poor performance.

Accordingly, since, for example, there are growing market segments for location-based services that require both location accuracy and other information associated with location accuracy, it would be desirable to provide devices, systems and methods for enabling estimation of the accuracy of positioning measurements and their associated algorithms in such systems that avoid the afore-described problems and drawbacks.

SUMMARY

Various techniques for estimating, storing and/or reporting inaccuracy associated with fingerprinting positioning algorithms are described herein. Among other things, embodiments described herein can provide one or more of the following benefits: a priori accuracy and confidence information being added to the positioning algorithm, improved positioning selection performance and/or improved positioning performance, however it will also be appreciated that these characteristics are not requirements of these embodiments.

According to an embodiment, a method for a network node in a wireless communication network generates inaccuracy characteristics associated with a fingerprinting positioning algorithm used to determine a position of a user equipment (UE) in a wireless network. The method determines a fingerprinting position reference, based on the fingerprinting positioning algorithm for the user equipment, and also determines a high-accuracy position reference, based on a high-accuracy positioning algorithm, for the user equipment. The method compares the fingerprinting position reference with the high-accuracy position reference to generate an error value, and generates at least one inaccuracy characteristic based on a plurality of the error values. A geographical region associated with the fingerprinting position reference is registered for the user equipment, and the at least one inaccuracy characteristic is associated with that geographical region.

According to another embodiment, a network node is connectable to a wireless communication network and configured to generate inaccuracy characteristics associated with a fingerprinting positioning algorithm which is used to determine a position of a user equipment in said wireless communication network. The network node includes one or more processors configured to execute computer instructions and a memory configured to store the computer instructions. The computer instructions comprise a collection component for collecting a fingerprinting position reference and a high-accuracy position reference for storage in the memory, a comparison component for comparing the fingerprinting position reference and the high-accuracy position reference and outputting an error result. The computer instructions also comprise an inaccuracy component for calculating at least one inaccuracy characteristic based on the error result from the comparison component and storing the inaccuracy measurement value in the memory, and a registration component for associating a geographical region with the fingerprinting positioning reference of the user equipment and the at least one inaccuracy characteristic.

According to another embodiment, a positioning node includes a processor configured to receive a positioning request associated with a user equipment and, in response thereto, configured to obtain a fingerprinting position associated with the user equipment, a high-accuracy position associated with the user equipment and to generate information associated with an accuracy of the fingerprinting position based on at least a comparison between the fingerprinting position and the high-accuracy position. The processor is further configured to generate a positioning response including the fingerprinting position and the information.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 1(*b*) is a schematic diagram of a geographical region containing fingerprinting positioning results, high-accuracy positioning results and an AECID polygon area with its associated AECID result according to an embodiment;

FIG. 2 is a graph depicting an "on-line" cumulative distribution function;

ACRONYMS/ABBREVIATIONS

| A-GNSS | Assisted GNSS |
| A-GPS | Assisted GPS |
| AECID | Adaptive Enhanced Cell Id |
| BS | Base Station |
| TA | Timing Advance |
| RTT | Round Trip Time |
| UE | User Equipment |

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of positioning servers or nodes in communication systems. However, the embodiments to be discussed next are not limited to these systems but may be applied to other communication systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

According to embodiments, methods and systems for estimating the accuracy (or equivalently inaccuracy) of fingerprinting positioning algorithms are described. As used herein, the phrases "accuracy measurement" and "inaccuracy measurement" are interchangeable and synonymous and, similarly, the phrases "accuracy characteristic" and "inaccuracy characteristic" are interchangeable and synonymous. Among other things, such embodiments employ the high-accuracy reference positions, which can also be collected for building a fingerprinting positioning database (either prior to the implementation of the database in a radio communication system or after the implementation of the database in the radio communication system), for the additional use of fingerprinting position accuracy assessment. However, it should be noted in the embodiments described below that this high-accuracy position reference data can be used solely for accuracy assessment or the data can also be included in the database generation itself.

Generally speaking, the embodiments use the positioning data collected from the fingerprinting algorithm(s) in conjunction with the high-accuracy positioning data to generate an error value. The embodiments then use the generated error values to generate one or more inaccuracy characteristics associated with a geographical region of the wireless network, e.g., in terms of a histogram that represents an inaccuracy cumulative distribution function (CDF) or an uncertainty/confidence value.

Figure 1A:
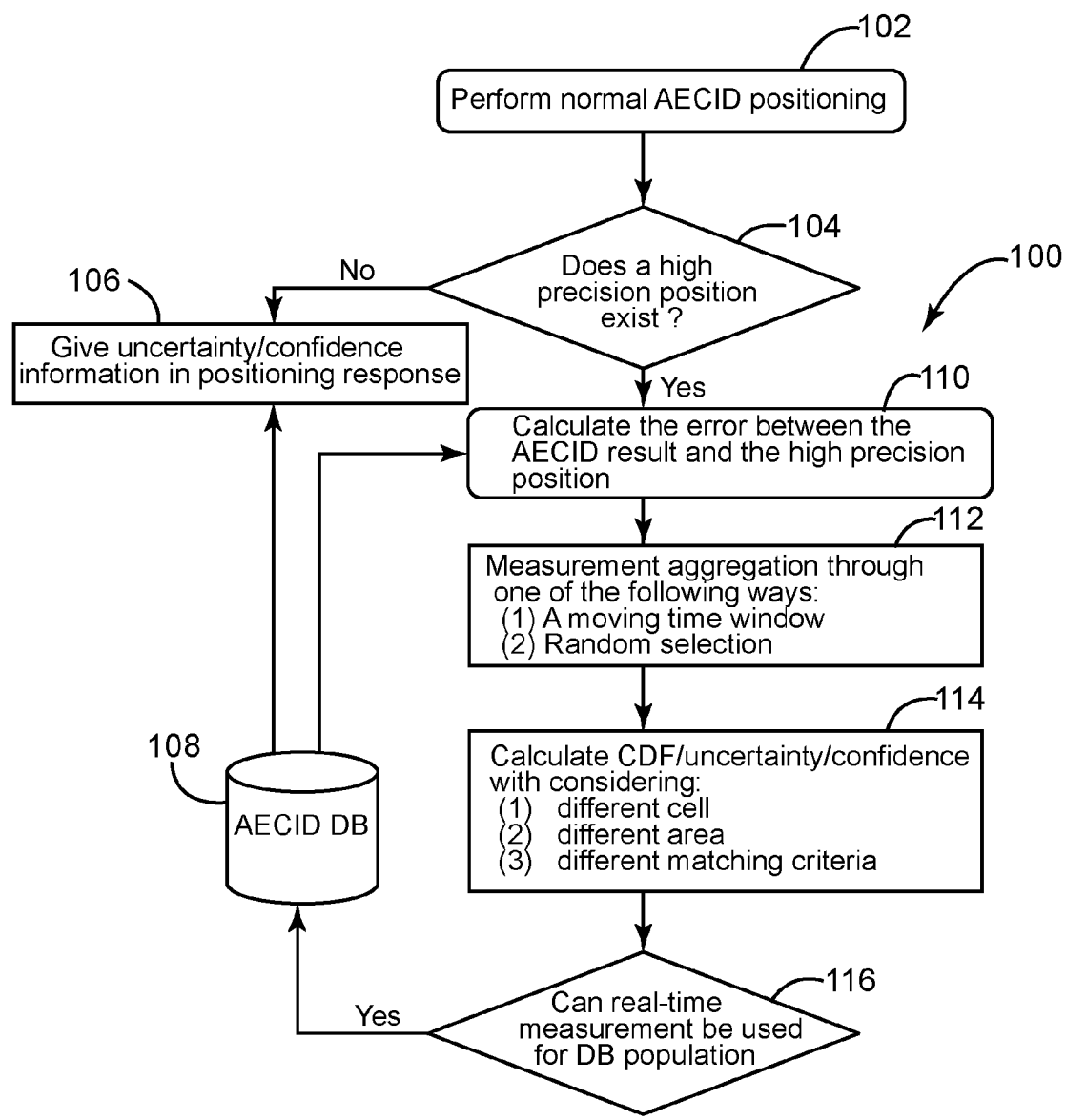
FIG. 1(*a*) is a flow diagram illustrating a method according to an embodiment.
Figure 1B:
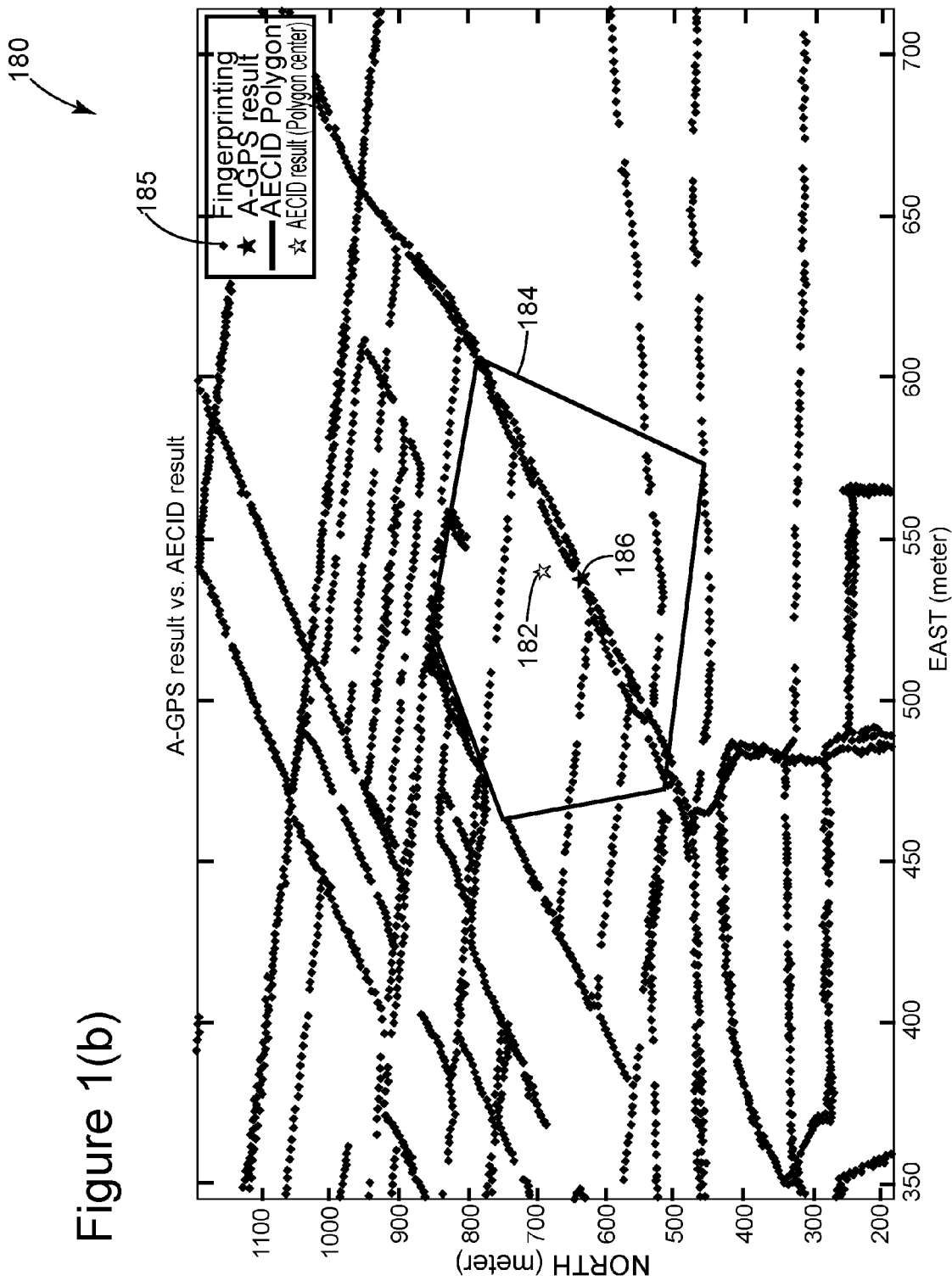

FIG. 1(*a*) is a flow chart illustrating various aspects of positioning according to these embodiments, including generating inaccuracy characteristics, interacting with a positioning database (DB) and generating positioning responses. Therein, it can be seen that methods for generating inaccuracy characteristics according to these embodiments can, for example, be performed in conjunction with "normal" fingerprinting positioning algorithm operation, e.g., in response to a positioning request, as indicated by block 102. Note that although AECID is used as an example of fingerprinting positioning in FIG. 1(*a*), the present invention is not limited thereto.

Continuing on to block 104, once a location for a particular UE using the fingerprinting positioning algorithm (or in parallel with such calculation) has been determined, it can be determined whether a high precision position also exists for this UE. If not, then the remaining steps on the right hand side of FIG. 1(*a*) can be skipped, as the possibility to update the inaccuracy characteristic on this iteration is not available without also having a high-accuracy position measurement from which to generate an error value, so the flow follows the "No" path to block 106, wherein a positioning response can be generated using the location generated by the fingerprinting positioning algorithm and also including inaccuracy information associated with that location, e.g., uncertainty/confidence information retrieved from the positioning database 108 as will be described further below.

Prior to describing the remaining steps in FIG. 1(*a*) and in order to provide a visual context for these embodiments, FIG. 1(*b*) depicts an exemplary region 180 associated with a coverage area in a radio communication network and various points of interest associated with positioning. The region 180 can be served by one or multiple base stations (not shown) in the radio communication system, and can include one or more user equipments (UEs, not shown) for which location or position information is desired. For example, a location 182 associated with a particular user UE and determined by a fingerprinting positioning algorithm, e.g., the AECID fingerprinting algorithm described above and performed in step 102, is identified as the center of polygon 184, which is more generally referred to herein as a "geographical region". As mentioned earlier, polygon 184 represents a geographical region within which the UE is expected to be located within a certain degree of confidence or certainty. However it will be appreciated by those skilled in the art that a geographical region need not be in the shape of a polygon and can take any shape. It should also be noted in the illustration of FIG. 1(*b*)

that many other fingerprinting locations 185 are depicted in the region 180, which fingerprinting locations 185 represent data points stored in the fingerprinting position database 108, or generated in real time by a model, from previous measurements.

Additionally, a highly-accurate positioning algorithm, e.g., A-GPS, can generate a location 186 for the same UE, which information is also used according to these embodiments in determining the accuracy of the fingerprinting positioning algorithm. More specifically, as will be described further below according to these embodiments, the high-accuracy reference value associated with location 186 is compared to the fingerprinting position reference value associated with location 182 and a positioning error value "e" is computed based on the comparison, as indicated by step 110 in FIG. 1(a). The high accuracy positioning algorithm can, for example, include one or more of the following: Assisted Global Positioning System (A-GPS), Observed Time Difference of Arrival (OTDOA) and/or Uplink Time Difference of Arrival (U-TDOA). Alternatively, or additionally, the high accuracy positioning algorithm need not use data obtained from signaling in the mobile radio network at all, e.g., it can use the Global Positioning System (GPS) or the UE's local position records. Those skilled in the art will appreciate that these are merely examples of high-accuracy techniques which can be used to determine the accuracy of a fingerprinting positioning technique in accordance with these embodiments.

Continuing now with the embodiment of FIG. 1(a), the error values or measurements can be aggregated in any desired way as indicated by step 112 in order to obtain sufficient data to calculate an inaccuracy characteristic or measurement. For example, a moving time window can be applied to update the number of real-time fingerprinting positioning measurements, in real-time, so that these measurements accurately reflect the positioning accuracy as the environment evolves and new positioning data becomes available. As a purely illustrative example, for each hour the oldest measurement can be removed and one new measurement can be added introduced into the sliding window wherein the length of the sliding window is maintained as a predetermined number of real-time fingerprinting positioning results.

In another example, the predetermined number of real-time fingerprinting positioning results is selected randomly or by a predefined criterion from the already available measurement set for use as input for "offline" fingerprinting positioning. In this exemplary embodiment, the "offline" measurements can be historical data or data provided by the operator from other sources. It should be noted in the exemplary embodiment that the accuracy calculations previously described are also applied to the "offline" data regardless of the origin of the "offline" data. The predetermined number of fingerprinting positioning results which are used in the calculation of the one or more accuracy/inaccuracy characteristics can be an "optimum" number, where an example of "optimum" is described below, however optimization of the number of error measurements which are aggregated is not required.

As indicated by step 114, at least one accuracy/inaccuracy characteristic is then calculated based on the aggregation of such error values "e". For example, a first accuracy characteristic calculation is based on an on-line cumulative distribution function (CDF) as represented by the graph 200 in FIG. 2. The CDF graph of FIG. 2 can be generated based on stored "e" values from the comparisons described above. To generate the CDF graph 200, an error range of values can be processed to count the number of errors that fall below a particular value or error threshold. Then, division by the total number of error values gives the percentage of the curve. It should be noted that a cumulative distribution function generated in this fashion implicitly contains confidence information based on a selected confidence being used to read the inaccuracy value from the cumulative distribution function histogram. For example, a particular percentile can be selected, e.g., 95% and then the corresponding accuracy value can be read from the CDF graph 200. In the context of this embodiment, the "on-line" nature of the graph 200 indicates that the fingerprinting positioning algorithm, e.g., AECID fingerprinting positioning, is executed or played simultaneously with the high-accuracy positioning algorithm in the same location session. However, it will be appreciated by those skilled in the art that according to other embodiments the fingerprinting positioning algorithm can also be executed or played sequentially with the high-accuracy positioning algorithm, i.e., in different sessions.

Alternatively, or in conjunction with calculating the first accuracy characteristic described above, a second accuracy characteristic can be calculated using the error values. This second accuracy/inaccuracy characteristic determines an uncertainty shape at a predetermined confidence level associated with the error values based on a two-dimensional covariance matrix. The covariance matrix "D" of this embodiment is represented by:

$$D = \begin{bmatrix} \text{var}(x) & p_{12} \\ p_{21} & \text{var}(y) \end{bmatrix} \quad (1)$$

The location uncertainty characteristics, e.g., uncertainty semi-major axis, uncertainty semi-minor axis, orientation of major axis and confidence, can be generated using Eigen-Decomposition. It should be noted in the exemplary embodiment that the calculations performed to solve the two-dimensional covariance matrix are well known to one skilled in the art but for example, assume the estimate of (x,y) are with Gaussian error, the two eigenvalues of "D" are "E1" and "E2" which corresponds to two-dimensional eigenvectors "V1" and "V2" respectively and E1>E2. For a predetermined confidence level "c" of the exemplary embodiment, the length of the semi-major axis of the uncertainty ellipse is $$a=\overline{E1*(-2*\ln(1-c))}(2)$$

and the length of the semi-minor axis of the uncertainty ellipse is $$b=\overline{E2*(-2*\ln(1-c))}(3)$$

where "ln" is the natural logarithm.

After calculation, the one or more inaccuracy characteristics can be evaluated to determine if they are suitable for use in populating the positioning database 108 as shown in step 116. For example, according to an embodiment, the decision of whether or not to include a measurement (or set of data associated with a measurement) at step 116 can involve the particular region 180 within which the measurement is disposed. For regions 180 wherein the database 108 already includes a large number of data points, then the new measurement may be added to the database 108 only if it has a high enough accuracy, e.g., greater than a first accuracy threshold. Alternatively, for regions 180 wherein the database 108 does not include a large number of data points, then the new measurement may be added to the database 108 with a lower accuracy, e.g., less than the first accuracy threshold.

It will be appreciated that the foregoing two examples of accuracy/inaccuracy characteristics which can be derived or calculated based on the stored or aggregated error values "e" are purely illustrative and that other types of accuracy/inaccuracy characteristics can be generated based on these "e" values. The accuracy/inaccuracy characteristics which can be derived or calculated based on the stored or aggregated error "e" values, e.g., the cumulative distribution function and/or the uncertainty and confidence calculation described above, can also take into account factors such as (but not limited to) different cells having different cumulative distribution function, uncertainty and confidence values based on different configurations for different cells because of network optimization, e.g., different characteristics and different coverage areas, radio environment variations and different matching criteria used during fingerprinting positioning, e.g., AECID positioning. Examples of matching criteria include, for example, Timing Advance, Round Trip Time, and User Equipment Receive-Transmit Time Difference.

For each geographical region 184 which is serviced by the radio communication system, it may be possible to directly calculate the one or more inaccuracy characteristics as described above and associate them with that geographical region 184. Alternatively, it may not be possible to, or desirable to, do so in all of the geographical regions 184 which comprise the radio communication system's coverage area. For any areas for which, e.g., an "online" cumulative distribution function and/or uncertainty and confidence value has not yet been computed, an extrapolation or interpolation technique can be used to generate inaccuracy characteristic(s) for those geographical regions based on, for example, the geographical distance between the subject area and adjacent areas for which inaccuracy characteristic(s) have been calculated, the environment/terrain difference between the subject area and adjacent "known" areas and the cell planning or radio characteristic, e.g., frequency, band, downtilt, beamwidth, etc., difference between the subject area and adjacent "known" areas.

In another aspect of these embodiments, in response to a fingerprinting positioning request, e.g., AECID positioning, based on the fingerprinting positioning result, a corresponding inaccuracy characteristic, e.g., a cumulative distribution function and/or uncertainty and confidence result, is used to provide uncertainty and confidence information in an associated positioning response, as indicated by step 106 in FIG. 1(*a*). Thus, the positioning response, e.g., generated by a positioning node in response to a request from a location-based service (LBS), can include both location or position information associated with the output of the fingerprinting positioning algorithm and uncertainty information associated with the inaccuracy characteristic which has been stored in a database for the geographical region in which the UE's determined position is disposed.

The afore-described embodiments can be implemented in a number of different ways, including both hardware and/or software in one or more various nodes of a radio communication system. Looking now to FIG. 3, and solely as one illustrative example, an accuracy assessment apparatus 300 for determining the accuracy of a fingerprinting positioning algorithm comprises a collection component 302, a comparison component 304 and an inaccuracy component 306. Continuing with the embodiment, the collection component 302 collects or determines the fingerprinting positioning measurements and the high-accuracy positioning measurements as previously described. It should be noted in the embodiment that a portion of the fingerprinting positioning measurements can be virtual measurements, e.g., artificial measurements generated via software as opposed to real, collected measurements, which are used to generate virtual fingerprinting positioning data. Next in the embodiment, the comparison component 304 organizes the pairs of measurements for an error calculation. Thus, the comparison component 304 compares one or more of the fingerprinting positioning measurements, either real or virtual, to one or more of the high-accuracy positioning measurements.

Figure 3:
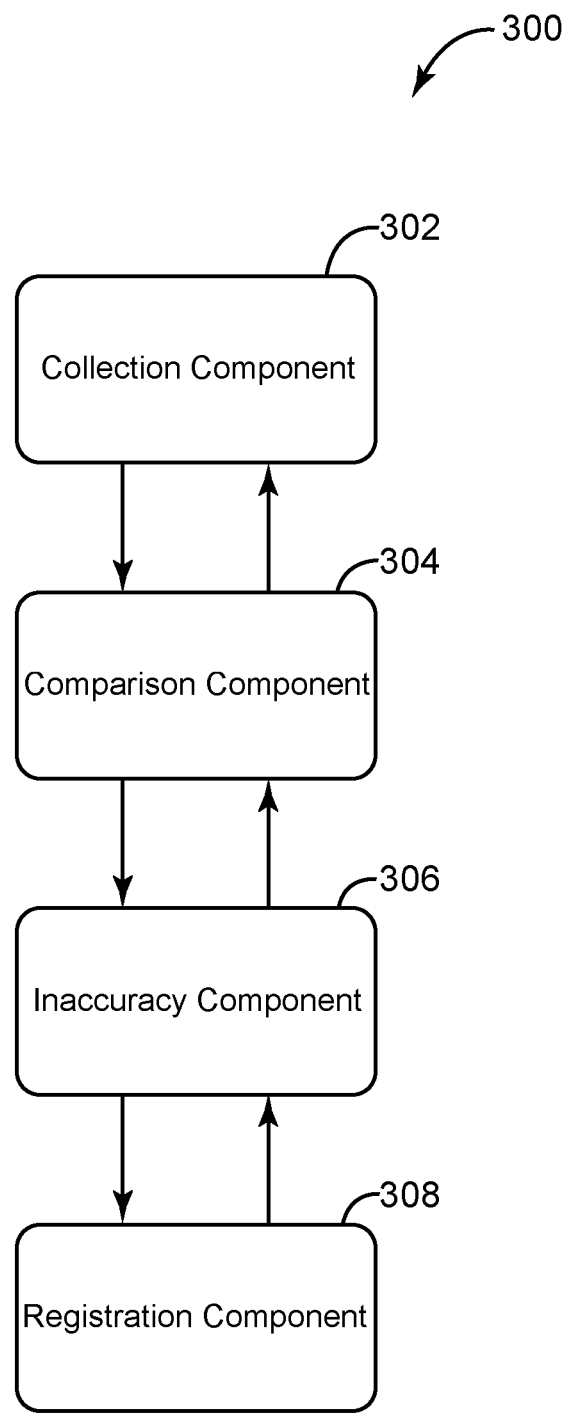
FIG. 3 is a schematic diagram depicting a network node in a wireless communication network for generating an inaccuracy characteristic associated with a fingerprinting positioning algorithm according to an embodiment.

Continuing with the embodiment of FIG. 3, the inaccuracy component 306 calculates inaccuracy characteristic(s) associated with the comparison results provided by the comparison component 304. The inaccuracy component 306 provides for calculating the inaccuracy and confidence values associated with a fingerprinting positioning measurement as previously described. In one exemplary embodiment, the inaccuracy component 306 can calculate an accuracy characteristic based on the optimum number of fingerprinting positioning results and the calculated error values. It should be noted in the exemplary embodiment that the inaccuracy component can choose which accuracy characteristic to calculate based on the optimum number of fingerprinting positioning results and/or the positioning errors. It should also be noted that the calculated accuracy characteristic can be a predetermined configuration parameter.

Next in the exemplary embodiment, a registration component 308 provides the ability to register the geographical region associated with the fingerprinting position reference. In another aspect of the exemplary embodiment, the registration component 308 also associates the calculated inaccuracy characteristic(s) with the geographical region associated with the user equipment.

Figure 4:
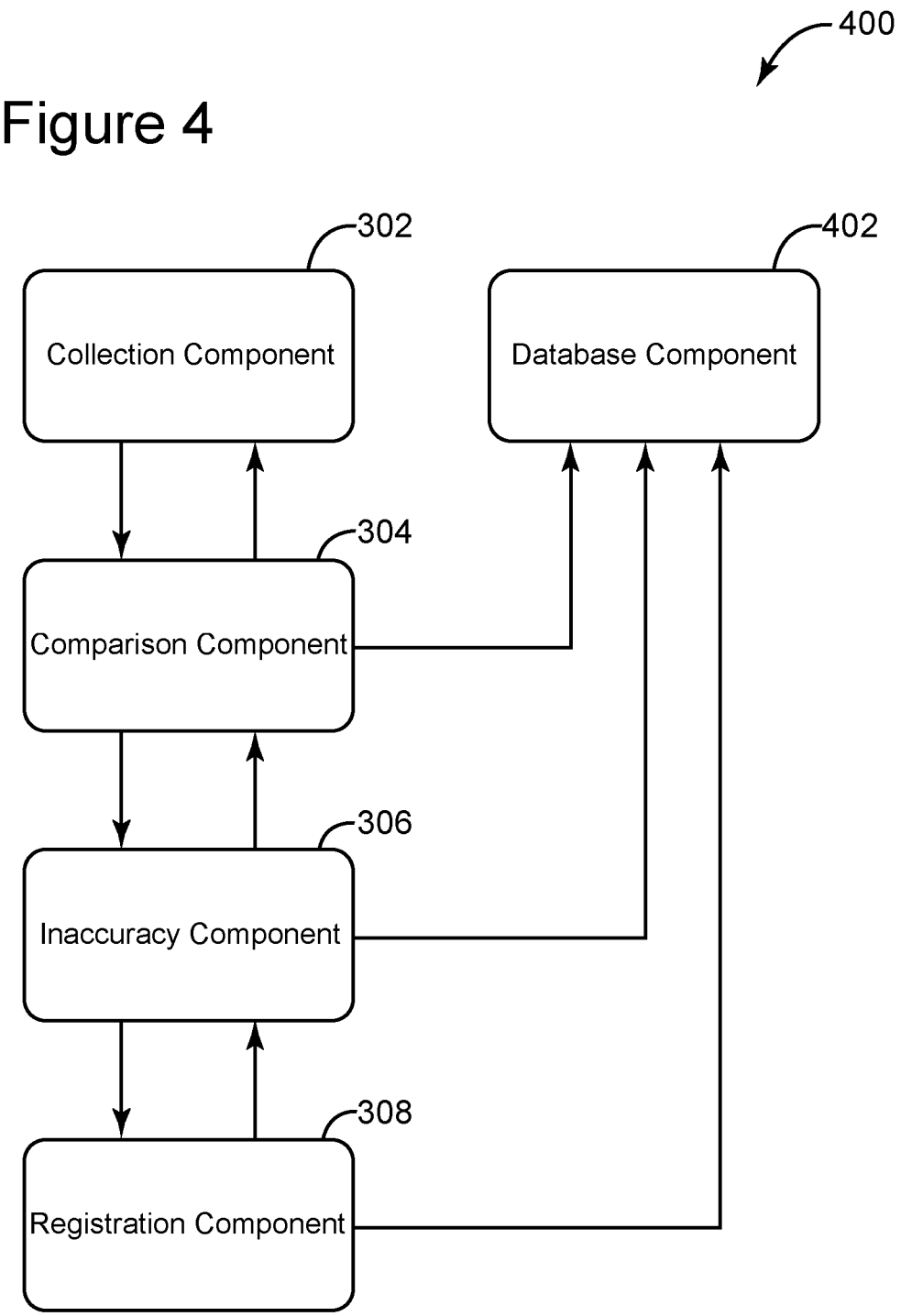
FIG. 4 is a schematic diagram depicting a network node in a wireless communication network for generating an inaccuracy characteristic associated with a fingerprinting positioning algorithm including a database component for storing positioning results and inaccuracy values.

Expanding on the embodiment of FIG. 3, FIG. 4 depicts an expanded version 400 of the accuracy assessment apparatus 300 of FIG. 3 further comprising a database component 402. The exemplary embodiment database component 402 is configured to store one or more of: fingerprinting positioning measurements and high-accuracy positioning measurements collected by the collection component 302, comparison results (e values) generated by the comparison component 304, and/or inaccuracy characteristics values calculated by the inaccuracy component 306. It should be noted in this embodiment that virtual fingerprinting position data can also be stored by the database component 402.

Figure 5:
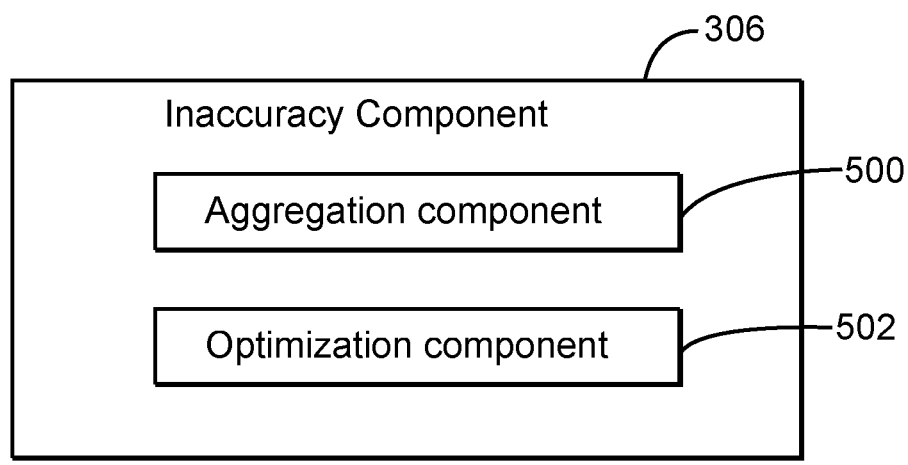
FIG. 5 is a schematic diagram depicting an inaccuracy component of a network node in a wireless communication network according to an embodiment.

Further expanding on the exemplary embodiment of FIG. 4, FIG. 5 depicts a portion of the embodiment 400 wherein the inaccuracy component 306 further comprises an aggregation component 500 and an optimization component 502. The aggregation component 502 can, for example, aggregate the fingerprinting positioning measurements with the high-accuracy positioning measurements once a predetermined area has become sufficiently populated, or alternatively aggregate the comparisons (error values), as previously described. The optimization component 502, if used, determines an optimum number of real-time fingerprinting positioning results. As previously described, the optimum number of fingerprinting positioning results is a function of, for example, the required reliability of the accuracy estimate, the characteristic of the measurements, the time domain interval of the real-time fingerprinting positioning results and the measurement density.

It should be noted in the exemplary embodiment that an optimum number of measurements can be determined for each predefined area and the optimum number can be different from one predefined area to another and, as previously mentioned, that usage of an optimum number of measurements is not required. If, however, it is desired to use an optimal number of measurements to generate inaccuracy characteristic(s), then an optimum number "m" of real-time fingerprinting positioning results for use in generating inaccuracy measurements can be determined as a function of the required reliability "P" of the accuracy estimate, the characteristic "C" of the measurements, e.g., variance of signal strength or number of neighborhood cell identity changes, which can be deduced from already available data, the time domain interval "l" of the real-time fingerprinting positioning results and a measurement density "k" for the area under consideration. It should further be noted in this context that a too short or a too long time interval between measurements requires a larger optimum number of real-time fingerprinting positioning results for achieving the necessary statistical significance and that also, if the measurement density is too low, then a larger optimum number of real-time fingerprinting positioning results is necessary because the characteristic of the measurements may become unreliable.

Given the potential significance of the number of measurements which are used to calculate the inaccuracy characteristic, according to some embodiments, a predetermined error threshold is configured for circumstances where the measurement density is below a predetermined measurement density threshold allowing for protection of the quality of the fingerprinting positioning database. It should be noted in the exemplary embodiment that the aforementioned threshold values can be cell, location and/or server specific.

Figure 6:
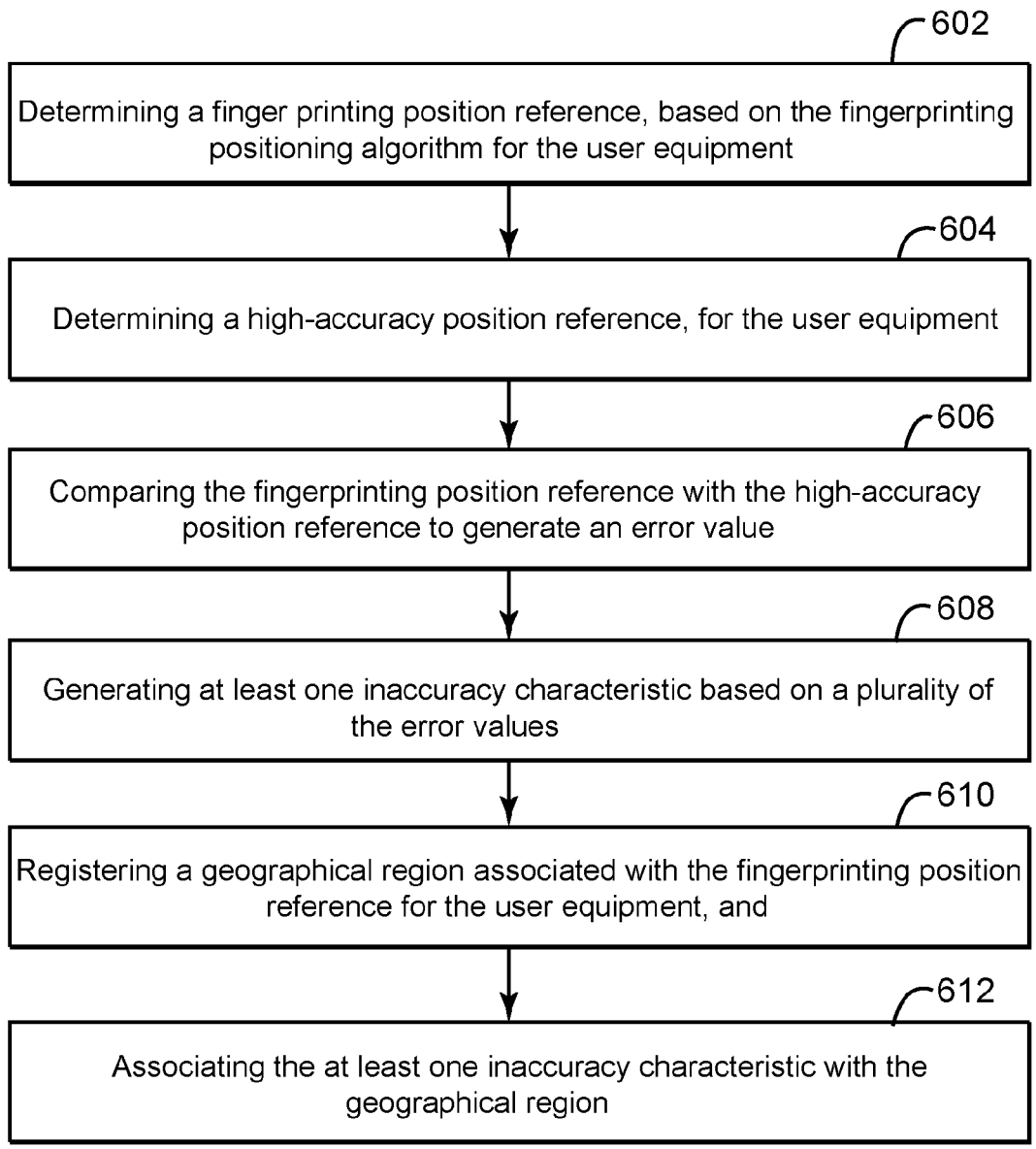
FIG. 6 is flow chart illustrating another method according to an embodiment.

Turning now to the flowchart of FIG. 6, a method 600 for a network node in a wireless communication network generates inaccuracy characteristics associated with a fingerprinting positioning algorithm used to determine a position of a user equipment (UE) in a wireless network according to an embodiment is illustrated. The method determines a fingerprinting position reference, based on the fingerprinting positioning algorithm for the user equipment (at step 602), and also determines a high-accuracy position reference, based on a high-accuracy positioning algorithm, for the user equipment (step 604). The method compares the fingerprinting position reference with the high-accuracy position reference to generate an error value (step 606), and generates at least one inaccuracy characteristic based on a plurality of the error values (step 608). A geographical region associated with the fingerprinting position reference is registered for the user equipment (step 610), and the at least one inaccuracy characteristic is associated with that geographical region (step 612).

Among other things, embodiments described herein can provide one or more of the following benefits: a priori accuracy and confidence information being added to the positioning algorithm, improved positioning selection performance and/or improved positioning performance, however it will also be appreciated that these characteristics are not requirements of these embodiments.

Mobile terminals that may act as client devices/user equipment as described in connection with the embodiments, and whose position or location it may be desirable to obtain, may be desktop/personal computers, workstations, large-scale computing terminals, wireless terminals, or any other computing device capable of executing presence awareness applications. The wireless terminals may include devices such as wireless/cellular telephones, personal digital assistants (PDAs), or other wireless handsets, as well as portable computing devices. The mobile terminals may utilize computing components to control and manage the conventional device activity as well as the functionality provided by the embodiments. Hardware, firmware, software or a combination thereof may be used to perform the various methods and techniques described in this document.

Figure 7:
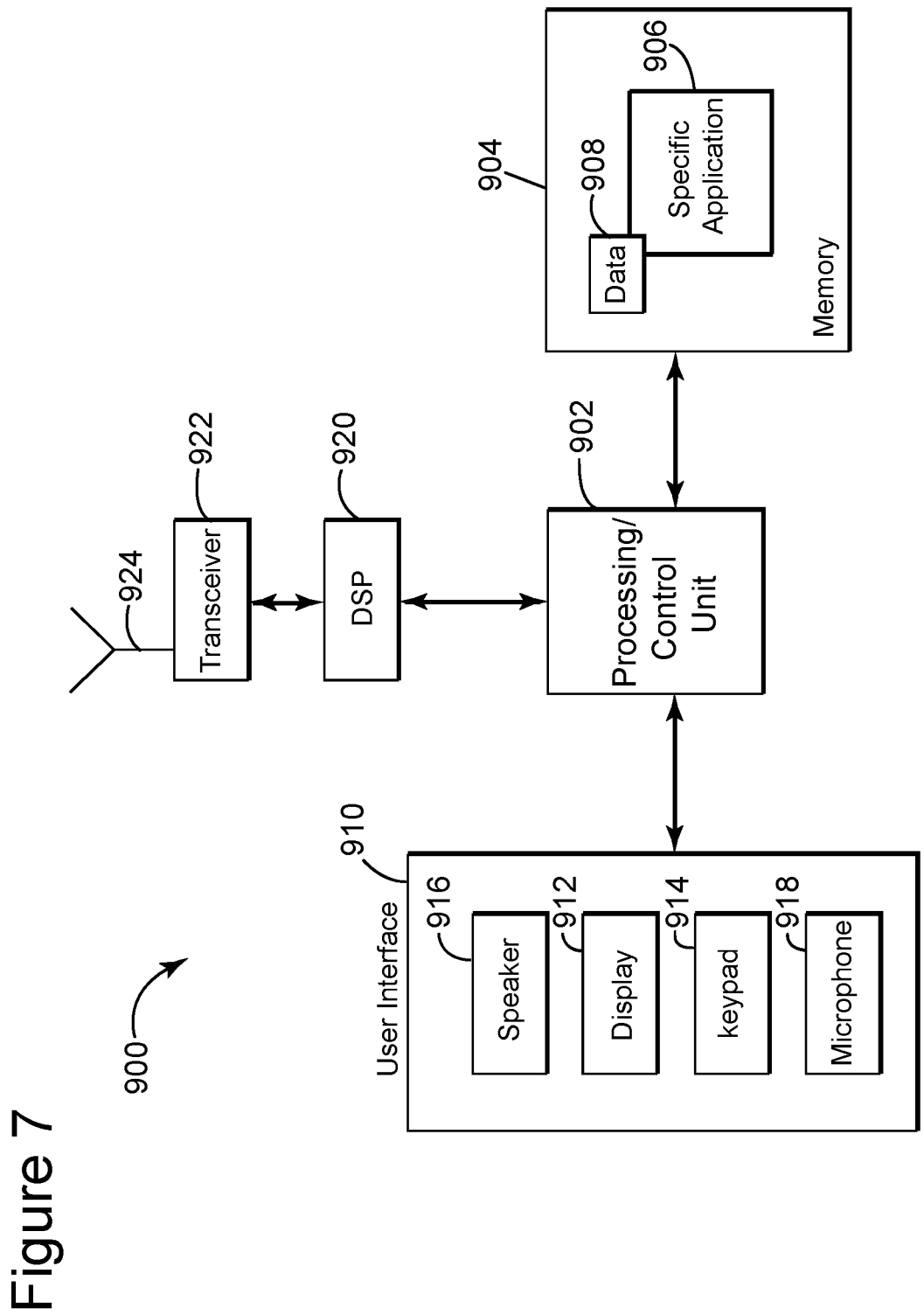
FIG. 7 is a schematic diagram of a user equipment.

For purposes of illustration and not of limitation, an example of a representative mobile terminal computing system capable of carrying out operations in accordance with the embodiments is illustrated in FIG. 7. It should be recognized, however, that the principles of the present embodiments are equally applicable to other devices.

The exemplary mobile computing arrangement 900 may include a processing/control unit 902, such as a microprocessor, reduced instruction set computer (RISC), or other central processing module. The processing unit 902 need not be a single device, and may include one or more processors. For example, the processing unit 902 may include a master processor and associated slave processors coupled to communicate with the master processor.

The processing unit 902 may control the basic functions of the mobile terminal as dictated by programs available in the storage/memory 904. More particularly, the storage/memory 904 may include an operating system and program modules for carrying out functions and applications on the mobile terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. The program modules and associated features may also be transmitted to the mobile computing arrangement 900 via data signals, such as being downloaded electronically via a network, such as the Internet.

One of the programs that may be stored in the storage/memory 904 is a specific program 906, e.g., associated with a location-based service. The program 906 and associated features may be implemented in software and/or firmware operable by way of the processor 902. The program storage/memory 904 may also be used to store data 908 associated with the present exemplary embodiments. In one exemplary embodiment, the programs 906 and data 908 are stored in non-volatile electrically-erasable, programmable ROM (EEPROM), flash ROM, etc. so that the information is not lost upon power down of the mobile terminal 900.

The processor 902 may also be coupled to user interface 910 elements associated with the mobile terminal. The user interface 910 of the mobile terminal may include, for example, a display 912 such as a liquid crystal display, a keypad 914, speaker 916, and a microphone 918. These and other user interface components are coupled to the processor 902 as is known in the art. The keypad 914 may include alpha-numeric keys for performing a variety of functions, including dialing numbers and executing operations assigned to one or more keys. Alternatively, other user interface mechanisms may be employed, such as voice commands, switches, touch pad/screen, graphical user interface using a pointing device, trackball, joystick, or any other user interface mechanism.

The mobile computing arrangement 900 may also include a digital signal processor (DSP) 920. The DSP 920 may perform a variety of functions, including analog-to-digital (A/D) conversion, digital-to-analog (D/A) conversion, speech coding/decoding, encryption/decryption, error detection and correction, bit stream translation, filtering, etc. The transceiver 922, generally coupled to an antenna 924, may transmit and receive the radio signals associated with a wireless device.

The mobile computing arrangement 900 of FIG. 7 is provided as a representative example of a computing environment in which the principles of the present exemplary embodiments may be applied. From the description provided herein, those skilled in the art will appreciate that the present invention is equally applicable in a variety of other currently known and future mobile and fixed computing environments. For example, the specific application 906 and associated features, and data 908, may be stored in a variety of manners, may be operable on a variety of processing devices, and may be operable in mobile devices having additional, fewer, or different supporting circuitry and user interface mechanisms.

Figure 8:
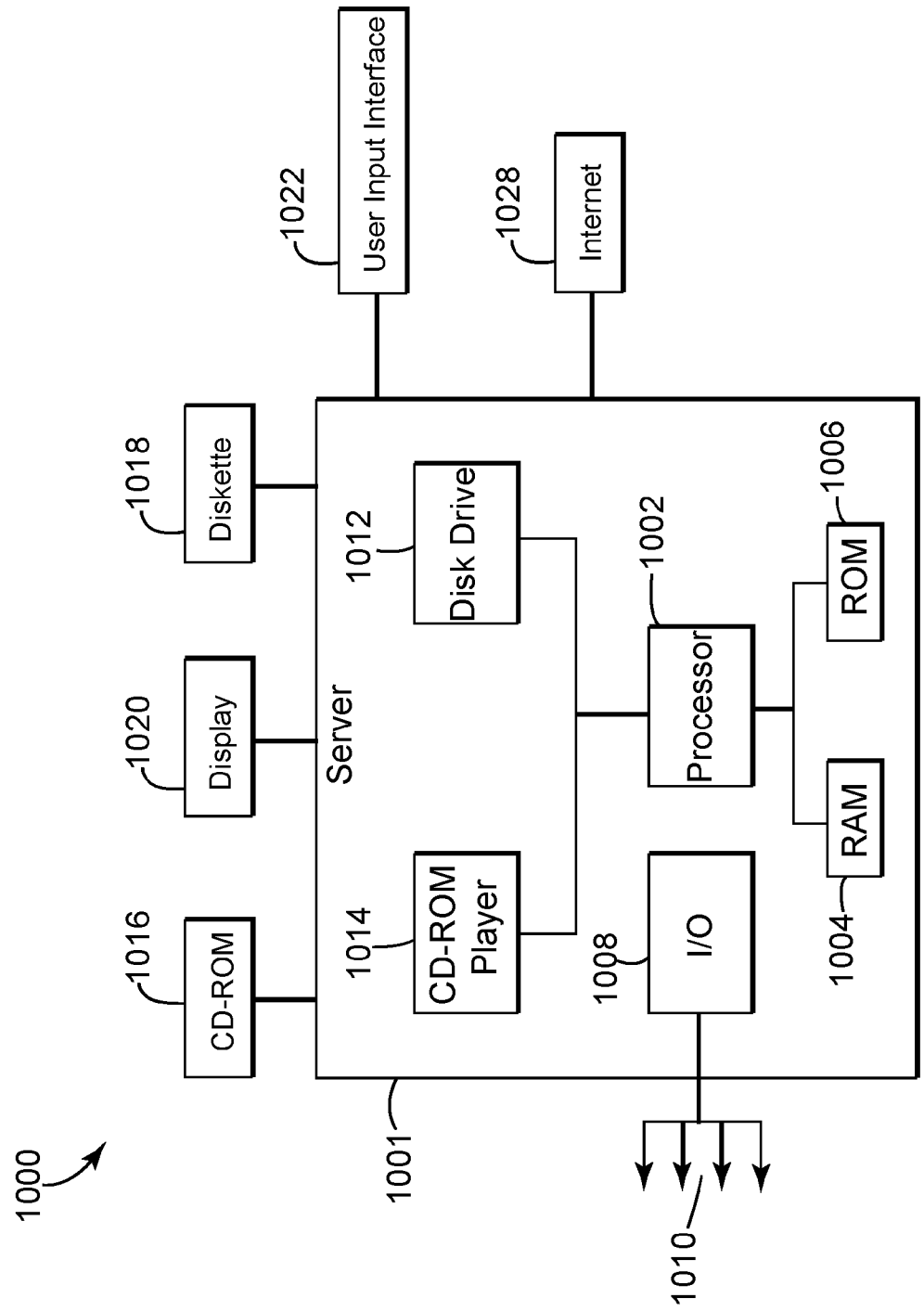
FIG. 8 is a schematic diagram of a network node.

The positioning server or other network nodes involved in the handling of positioning accuracy information in connection with the above described embodiments may be any type of computing device capable of processing and communicating positioning information. An example of a representative computing system or network node capable of carrying out operations in accordance with the servers of the exemplary embodiments is illustrated in FIG. 8. Hardware, firmware, software or a combination thereof may be used to perform the various steps and operations described herein. The computing structure or network node 1000 of FIG. 8 is an exemplary computing structure that may be used in connection with such a system.

The exemplary computing arrangement or network node 1000 suitable for performing the activities described in the exemplary embodiments may include a positioning server or associated nodes. Such a server 1001 may include a central processor (CPU) 1002 coupled to a random access memory (RAM) 1004 and to a read-only memory (ROM) 1006. The ROM 1006 may also be other types of storage media to store programs, such as programmable ROM (PROM), erasable PROM (EPROM), etc. The processor 1002 may communicate with other internal and external components through input/output (I/O) circuitry 1008 and bussing 1010, to provide control signals and the like. The processor 1002 carries out a variety of functions as is known in the art, as dictated by software and/or firmware instructions.

The server 1001 may also include one or more data storage devices, including hard and floppy disk drives 1012, CD-ROM drives 1014, and other hardware capable of reading and/or storing information such as DVD, etc. In one embodiment, software for carrying out the above discussed steps may be stored and distributed on a CD-ROM 1016, diskette 1018 or other form of media capable of portably storing information. These storage media may be inserted into, and read by, devices such as the CD-ROM drive 1014, the disk drive 1012, etc. The server 1001 may be coupled to a display 1020, which may be any type of known display or presentation screen, such as LCD displays, plasma display, cathode ray tubes (CRT), etc. A user input interface 1022 is provided, including one or more user interface mechanisms such as a mouse, keyboard, microphone, touch pad, touch screen, voice-recognition system, etc.

The server 1001 may be coupled to other computing devices, such as the landline and/or wireless terminals and associated watcher applications, via a network. The server may be part of a larger network configuration as in a global area network (GAN) such as the Internet 1028, which allows ultimate connection to the various landline and/or mobile client/watcher devices.

Thus, FIG. 8 illustratively represents a network node 1000 connectable to a wireless communication network and configured to generate inaccuracy characteristics associated with a fingerprinting positioning algorithm which is used to determine a position of a user equipment in said wireless communication network according to an embodiment. The network node includes one or more processors 1002 configured to execute computer instructions and a memory 1004, 1006 configured to store the computer instructions. The computer instructions further comprise a collection component 302 for collecting a fingerprinting position reference and a high-accuracy position reference for storage in the memory, a comparison component 304 for comparing the fingerprinting position reference and the high-accuracy position reference and outputting an error result, an inaccuracy component 306 for calculating at least one inaccuracy characteristic based on the error result from the comparison component and storing the inaccuracy measurement value in the memory, and a registration component for associating a geographical region with the fingerprinting positioning reference of the user equipment and the at least one inaccuracy characteristic.

The disclosed embodiments provide, for example, a network node, a method and a computer program product for obtaining/determining, storing and/or supplying information associated with inaccuracy of fingerprinting positioning algorithms and their results. It should be understood that this description is not intended to limit the invention. On the contrary, the embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

The invention claimed is:

1. A method for a network node in a wireless communication network for generating inaccuracy characteristics associated with a fingerprinting positioning algorithm used to determine a position of a user equipment (UE) in said wireless communication network, said method comprising:
    determining a fingerprinting position reference, based on said fingerprinting positioning algorithm, for said user equipment;
    determining a high-accuracy position reference for said user equipment;
    comparing said fingerprinting position reference and said high-accuracy position reference to generate an error value;
    generating at least one inaccuracy characteristic based on a plurality of said error values;
    registering a geographical region associated with said fingerprinting position reference, for said user equipment; and
    associating said at least one inaccuracy characteristic with said geographical region,
    wherein said at least one inaccuracy characteristic is based on at least one of: a cumulative distribution function algorithm and an uncertainty shape at a predefined confidence level algorithm and further wherein said uncertainty shape is determined based on a two-dimensional covariance matrix.

2. The method of claim 1, further comprising storing one or more of said fingerprinting position reference, said high-accuracy position reference, said error value, and said at least one inaccuracy characteristic in a database.

3. The method of claim 2, wherein said at least one inaccuracy characteristic is calculated for at least one region of multiple cells of said wireless communication network using said error values stored in said database.

4. The method of claim 1, further comprising:
calculating an optimum number of said fingerprinting position references based on aggregating a plurality of said fingerprinting position references and a plurality of said high-accuracy position references, associated with a predefined area containing said user equipment; and
calculating said at least one inaccuracy characteristic based on said plurality of said error values and said optimum number of said fingerprinting position references.

5. The method of claim 4, wherein said optimum number of said fingerprinting position references is calculated as a function of at least one of a reliability of said at least one inaccuracy characteristic, a radio signature of said fingerprinting position references, a time domain interval of said fingerprinting position references, and a position measurement density.

6. The method of claim 5, wherein said radio signature of said fingerprinting position references is selected from a list comprising variance of signal strength and number of neighbor cell identity changes.

7. The method of claim 4, wherein a recalculation of said optimum number of said fingerprinting position references occurs in real-time.

8. The method of claim 7, wherein said recalculation is a sliding window wherein older measurements are removed as newer measurements are added.

9. The method of claim 4, wherein a recalculation of said optimum number of said fingerprinting position references occurs from a database of historical position data.

10. The method of claim 1, wherein said fingerprinting positioning algorithm is an Adaptive Enhanced Cell Identification (AECID) algorithm.

11. The method of claim 1, wherein said high-accuracy position reference is generated from one or more high-accuracy positioning algorithms comprising Assisted Global Positioning System (A-GPS), Observed Time Difference of Arrival (OTDOA) and Uplink Time Difference of Arrival (U-TDOA), and Global Positioning System (GPS).

12. The method of claim 1, wherein said cumulative distribution function algorithm comprises simultaneously executing said fingerprinting positioning algorithm and a high-accuracy positioning technique within a single location session.

13. The method of claim 1, wherein said cumulative distribution function algorithm comprises sequentially executing said fingerprinting positioning algorithm and a high-accuracy positioning algorithm.

14. The method of claim 1, wherein eigenvalues associated with said two-dimensional covariance matrix are used to calculate a semi-major axis length, which equals the square root of a quantity $(E1*(-2*\ln(1-c)))$, and a semi-minor axis length, which equals the square root of a quantity $(E2*(-2*\ln(1-c)))$, of an uncertainty ellipse, wherein E1 is an eigenvalue representing an eigenvector of said semi-major axis length, E2 is an eigenvalue representing an eigenvector of said semi-minor axis length, c is a confidence level and ln is a natural logarithm calculation.

15. The method of claim 1, wherein said at least one inaccuracy characteristic is calculated based on one or more of: changes in radio environment, and matching criteria during a positioning calculation.

16. The method of claim 1, further comprising populating a database with said inaccuracy characteristics for use in determining the accuracy of said fingerprinting positioning algorithm for user equipment not associated with generating said inaccuracy characteristics.

17. The method of claim 16, wherein data from said database is interpolated or extrapolated based on at least one of: geographical distance between an area where said data was collected and an area where said data is used, changes in radio environment and/or changes in terrain between an area where said data was collected and an area where said data is used, and on a radio characteristic difference comprising frequency band, downtilt and beamwidth between an area where said data was collected and an area where said data is used.

18. A network node connectable to a wireless communication network and configured to generate inaccuracy characteristics associated with a fingerprinting positioning algorithm which is used to determine a position of a user equipment in said wireless communication network, said network node comprising:
one or more processors configured to execute computer instructions and a memory configured to store said computer instructions wherein said computer instructions further comprise:
a collection component for collecting a fingerprinting position reference and a high-accuracy position reference for storage in said memory;
a comparison component for comparing said fingerprinting position reference and said high-accuracy position reference and outputting an error result;
an inaccuracy component for calculating at least one inaccuracy characteristic based on said error result from said comparison component and storing said at least one inaccuracy characteristic in said memory; and
a registration component for associating a geographical region with said fingerprinting positionreference of said user equipment and said at least one inaccuracy characteristic,
wherein said at least one inaccuracy characteristic is based on at least one of: a cumulative distribution function algorithm and an uncertainty shape at a predefined confidence level algorithm and further wherein said uncertainty shape is determined based on a two-dimensional covariance matrix.

19. The network node of claim 18, further comprising a database for storing one or more of said fingerprinting position reference, said high-accuracy position reference, said error result and said at least one inaccuracy characteristic associated with said wireless communication network.

20. The network node of claim 19, further comprising:
an aggregation component for calculating and aggregating an optimum number of said fingerprinting position references based on fingerprinting position reference data from said database.

21. The network node of claim 20, wherein said aggregation component further comprises an optimization component for determining if a calculated optimum number of said fingerprinting position references result meets a predetermined statistical requirement.

22. The network node of claim 18, further comprising a distribution component for providing said at least one inaccuracy characteristic in a position request response.

23. The network node of claim 18, wherein said inaccuracy component further comprises an estimation component for interpolating and extrapolating said at least one inaccuracy characteristic for locations of said wireless communication network where insufficient data exists to calculate said at least one inaccuracy characteristic.

24. A positioning node comprising:
a processor configured to receive a positioning request associated with a user equipment and, in response thereto, configured to:
obtain a fingerprinting position associated with said user equipment, a high-accuracy position associated with said user equipment and to generate information associated with an accuracy of the fingerprinting position based on at least a comparison between the fingerprinting position and the high-accuracy position;
calculate at least one inaccuracy characteristic based on the information;
associate a geographical region with the fingerprinting position and the at least one inaccuracy characteristic; and
generate a positioning response including the fingerprinting position and the information,
wherein the at least one inaccuracy characteristic is based on at least one of: a cumulative distribution function algorithm and an uncertainty shape at a predefined confidence level algorithm and further wherein the uncertainty shape is determined based on a two-dimensional covariance matrix.

* * * * *